US008187990B2

United States Patent
Avedikian et al.

(10) Patent No.: US 8,187,990 B2
(45) Date of Patent: May 29, 2012

(54) HOLLOW PIECE FOR PRODUCING A SINTERED REFRACTORY PRODUCT EXHIBITING IMPROVED BUBBLING BEHAVIOUR

(75) Inventors: Richard Avedikian, Robion (FR); Yves Boussant-Roux, Montfavet (FR); Jacques Guigonis, Pernes les Fontaines (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 738 days.

(21) Appl. No.: 12/206,642

(22) Filed: Sep. 8, 2008

(65) Prior Publication Data

US 2009/0062106 A1 Mar. 5, 2009

Related U.S. Application Data

(63) Continuation-in-part of application No. 10/569,955, filed as application No. PCT/FR2004/002210 on Aug. 30, 2004, now abandoned.

(30) Foreign Application Priority Data

Sep. 1, 2003 (FR) ..................................... 03 10350

(51) Int. Cl.
 *C04B 35/48* (2006.01)
 *C04B 35/49* (2006.01)
 *C04B 35/00* (2006.01)
(52) U.S. Cl. .......................... 501/105; 501/107; 501/128
(58) Field of Classification Search .................. 501/105, 501/107, 128; 51/307, 308
See application file for complete search history.

(56) References Cited

U.S. PATENT DOCUMENTS

| | | | | |
|---|---|---|---|---|
| 3,353,976 A | * | 11/1967 | Raine et al. | 501/128 |
| 3,808,013 A | * | 4/1974 | Manigault | 501/128 |
| 4,119,472 A | | 10/1978 | Brashear et al. | |
| 4,308,067 A | | 12/1981 | Guigonis et al. | |
| 5,346,870 A | | 9/1994 | Noguchi et al. | |
| 6,509,287 B2 | * | 1/2003 | Boussant-Roux et al. | 501/105 |
| 7,101,819 B2 | | 9/2006 | Rosenflanz et al. | |
| 2001/0019992 A1 | | 9/2001 | Sertain et al. | |
| 2002/0013212 A1 | | 1/2002 | Colozzi et al. | |
| 2003/0126804 A1 | * | 7/2003 | Rosenflanz et al. | 51/307 |
| 2004/0148868 A1 | * | 8/2004 | Anderson et al. | 51/308 |

FOREIGN PATENT DOCUMENTS

| | | |
|---|---|---|
| DE | 38 42 280 | 6/1989 |
| EP | 0818259 B1 | 10/2001 |
| GB | 2 147 287 | 5/1985 |
| GB | 2147287 A * | 5/1985 |
| JP | 10024351 A | 1/1998 |

OTHER PUBLICATIONS

Japanese Office Action, dated Jul. 12, 2011, in Application No. 2006525851.

* cited by examiner

*Primary Examiner* — Jerry Lorengo
*Assistant Examiner* — Lynne Edmondson
(74) *Attorney, Agent, or Firm* — Young & Thompson

(57) ABSTRACT

A green part, a region of a refractory furnace or a hollow piece for producing a sintered refractory has the following mean mineral chemical composition in weight percent based of mineral oxides: $40\% \leq Al_2O_3 \leq 94\%$, $0\% \leq ZrO_2 \leq 41\%$, $2\% \leq SiO_2 \leq 22\%$, $1\% < Y_2O_3+V_2O_5+TiO_2+Sb_2O_3+Yb_2O_3+Na_2O$. The sintered refractory products obtained from this green part give rise to a reduced bubbling effect.

19 Claims, No Drawings ic) that will be eliminated during the sintering. The mineral chemical composition of the green part is therefore determined on a sintered product obtained after sintering this green part.

HOLLOW PIECE FOR PRODUCING A SINTERED REFRACTORY PRODUCT EXHIBITING IMPROVED BUBBLING BEHAVIOUR

BACKGROUND OF THE INVENTION

1. Field of the Invention

The invention relates to an aluminous sintered refractory product, to a process for manufacturing this refractory product and to a green part, or "preform", intended to be sintered in order to obtain this refractory product.

2. Description of the Related Art

Among refractories, a distinction may be made between fused-cast products and sintered products.

Unlike sintered products, as described for example in US 2001/0019992 A1, fused-cast products usually comprise an intergranular glassy phase that links the crystallized grains together. The problems posed by sintered products and by fused-cast products, and the technical solutions adopted for solving them, are therefore generally different. A composition developed for manufacturing a fused-cast product cannot therefore a priori be used as such for manufacturing a sintered product, and vice versa.

Sintered products are obtained by mixing appropriate raw materials, then making a green form from this mixture and firing the resulting green form at a temperature and for a time that are sufficient to sinter this green form. This firing may be carried out in firing furnaces or else in situ in the glass furnace for products sold unfired or unfashioned.

Sintered products, depending on their chemical composition and their method of preparation, are intended for a wide variety of industries.

Among sintered products, alumina-zirconia-silica products, commonly called AZS products, and also called aluminous products are used in zones of glass-melting furnaces.

Products such as those described in FR 2 552 756 in the name of Emhart Industries are generally very suitable. Products such as BPAL, ZA33 or ZIRAL, which are produced and sold by Saint-Gobain SefPro, are also particularly well suited and very widely used at the present time. However, with certain recent glass compositions, the formation of bubbles has been observed. These bubbles are generated upon contact with the refractories that make up the furnace and are then trapped in the glass, giving rise to unacceptable defects.

There is therefore a need for a sintered product that gives rise to reduced bubbling effect and that can be used in glass furnaces. The aim of the present invention is to satisfy this need.

BRIEF SUMMARY OF THE INVENTION

For this purpose, the invention proposes a green part or a region of a refractory furnace obtained by sintering a green part having the following average mineral chemical composition, in percentages by weight on the basis of the mineral oxides:

40%≦$Al_2O_3$≦97%, or $Al_2O_3$≦94%

0%≦$ZrO_2$≦41%,

2%≦$SiO_2$≦22%, preferably 3%≦$SiO_2$≦22%

1%≦$Y_2O_3$+$V_2O_5$+$TiO_2$+$Sb_2O_3$+$Yb_2O_3$+$Na_2O$.

Advantageously, as we will see later, the sintered refractory products obtained from this green part give rise to a reduced bubbling effect.

$TiO_2$ may be 2% or more. Preferably, in some embodiments, $TiO_2$≦0.9%, preferably $TiO_2$≦0.5%

According to other preferred features of the invention: $ZrO_2$<35%, preferably $ZrO_2$<30%;

the total $Y_2O_3$+$V_2O_5$+$TiO_2$+$Sb_2O_3$+$Yb_2O_3$+$Na_2O$ content is 5% or less. This is because, above this value, the main crystalline phases may be modified, resulting in degradation of other properties of the products (corrosion resistance or release of defects for example);

the total $Y_2O_3$+$V_2O_5$+$TiO_2$+$Sb_2O_3$+$Yb_2O_3$+$Na_2O$ content is greater than 1%, preferably greater than 2% and more preferably greater than 3%, in percentages by weight on the basis of the mineral oxides. This is because a high $Y_2O_3$+$V_2O_5$+$TiO_2$+$Sb_2O_3$+$Yb_2O_3$+$Na_2O$ content advantageously improves the bubbling behavior of the product; and the content of at least one oxide from $Y_2O_3$, $V_2O_5$, $TiO_2$, $Sb_2O_3$, $Yb_2O_3$ and $Na_2O$, preferably from $Y_2O_3$, $V_2O_5$, $TiO_2$, $Sb_2O_3$ and $Yb_2O_3$ and even more preferably from $Y_2O_3$ and $TiO_2$ is greater than 1%, preferably greater than 2% and more preferably greater than 3%, in percentages by weight on the basis of the mineral oxides. $TiO_2$ and $Y_2O_3$ are the preferred oxides from $Y_2O_3$, $V_2O_5$, $TiO_2$, $Sb_2O_3$, $Yb_2O_3$ and $Na_2O$. This is because they give very good results at a reduced cost. However, the use of $Na_2O$ may be prejudicial to feasibility on an industrial scale since the possible formation of nepheline ($2SiO_2.Al_2O_3.Na_2O$) may lead to defects;

$Fe_2O_3$≦1.0%, preferably $Fe_2O_3$≦0.5%, preferably $Fe_2O_3$≦0.3%;

The invention also relates to a refractory product that is obtained by sintering a green part according to the invention that therefore has an average mineral chemical composition in terms of oxides in accordance with that of a green part according to the invention.

This is because the oxide composition of the sintered product is approximately equal to that of the green part and of the starting mixture.

The invention also relates to the use of a refractory product according to the invention in a region of a glassmaking furnace, in particular for the manufacture of soda-lime (CSL) or extra-white soda-lime (EWSL) glass.

Finally, the invention relates to a process for manufacturing a sintered refractory product, comprising at least the following successive steps:

a) preparation of a green part according to the invention from a mixture of raw materials to which has been added an amount of greater than 1% and preferably of 5% or less of a constituent consisting of one or more of the oxides from $Y_2O_3$, $V_2O_5$, $TiO_2$, $Sb_2O_3$, $Yb_2O_3$ and $Na_2O$, in percentages by weight on the basis of the mineral oxides; and b) sintering of said green part.

Advantageously, adding an amount greater than 1% of a constituent comprising at least one oxide from $Y_2O_3$, $V_2O_5$, $TiO_2$, $Sb_2O_3$, $Yb_2O_3$ and $Na_2O$ ensures that this amount exceeds 1% in the manufactured product, whatever the level of impurities of the raw materials used.

Preferably, no $Fe_2O_3$ is added, but as an impurity in the raw materials. Preferably the mixture of raw materials is adapted so that the green part is according to the invention.

The term "green part" is understood to mean the part before sintering. The sintering corresponds to the thermal consolidation of the material. It is generally accompanied by a reduction in the porosity and by dimensional shrinkage. Conventionally, the green part consists of mineral oxides (mineral chemical composition), water and organic compounds (binders) that provide the part with mechanical integrity. The water and the organic binders are removed during the sintering thermal cycle.

The invention also concerns a green part comprising a following average mineral chemical composition, in percentages by weight on the basis of mineral oxides $85\% \leq Al_2O_3 \leq 97\%$, $2\% \leq SiO_2 \leq 8\%$, $0 \leq ZrO_2 \leq 5\%$, $1\% < Y_2O_3+V_2O_5+TiO_2+Sb_2O_3+Yb_2O_3 \leq 5\%$, $Fe_2O_3 \leq 1.0\%$, $TiO_2 \leq 0.9\%$, and a green part comprising a following average mineral chemical composition, in percentages by weight on the basis of mineral oxides $40\% \leq Al_2O_3 \leq 80\%$, $6\% \leq SiO_2 \leq 22\%$, $5\% \leq ZrO_2 < 41\%$, $1\% < Y_2O_3+V_2O_5+TiO_2+Sb_2O_3+Yb_2O_3 \leq 5\%$, $Fe_2O_3 \leq 1.0\%$, $TiO_2 \leq 0.9\%$.

All numerical values given herein can be considered as approximate.

DETAILED DESCRIPTION

The following nonlimiting examples are given for the purpose of illustrating the invention.

In these examples, the raw materials employed were chosen from:
- particles having a size of between 0 and 20 mm, which are obtained by milling electrocast refractories such as ER-1681 or ER-1711, produced and sold by Société Européenne des Produits Réfractaires [European Refractories Society]. These products contain, in percentage by weight on the basis of the oxides: 32 to 54% $ZrO_2$; 36 to 51% $Al_2O_3$; 2 to 16% $SiO_2$; and 0.2 to 1.5% $Na_2O$;
- tabular or electrocast alumina particles containing more than 99% alumina having a size of between 40 μm and 3.5 mm;
- fused or sintered mullite particles, for example a powder containing 76.5% $Al_2O_3$ and 22.5% $SiO_2$, the particle size varying from 0.7 to 3 mm;
- products having a high zirconia content, such as CS10 or CC10, sold by Société Européenne des Produits Réfractaires. These products contain more than 99% $ZrO_2$ and the mean diameter ($D_{50}$) of the zirconia particles is 3.5 μm;
- reactive alumina, or a mixture of reactive aluminas, containing more than 99% $Al_2O_3$, it being possible for the mean diameter of the reactive alumina particles to vary from 0.5 μm to 3 μm;
- electrocast alumina, the particles of which have a size of between 0.04 and 0.5 mm;
- silica fume sold by Société Européenne des Produits Réfractaires. This vitreous silica contains more than 93% silica ($SiO_2$) and takes the form of a powder whose particles have a mean diameter of at most 1 μm. All our examples contain at least 2% thereof;
- a hydraulic cement or a mixture of various cements; it is preferred to use a high-alumina cement, such as CA25 from Alcoa. CA25 contains more than 78% $Al_2O_3$ and less than 19% CaO;
- zircon in sand or well-micronized form, containing 33% silica;
- yttrium oxide, titanium oxide, vanadium oxide, ytterbium oxide and/or antimony oxide of greater than 99% purity; and
- sodium carbonate $Na_2CO_3$.

Sintered refractory blocks were manufactured according to a process conventionally comprising the following steps:
a) preparation of a mixture of raw materials;
b) formation of a green part from said mixture; and
c) sintering of said green part.

At step a), the raw materials were metered so that the mixture had the desired average mineral chemical composition by weight, and then mixed in the presence of water and at least one dispersant, for example a sodium phosphate.

The mixture was then cast in a mould with the dimensions 230 mm×114 mm×64 mm so as to form a green part having sufficient mechanical strength to be able to be handled.

The green part was then sintered at a temperature of between 1300° C. and 1500° C., so as to form a refractory block.

Specimens were taken from the various examples of blocks produced in order to carry out bubbling tests. The specimen of refractory constituted a crucible having a wall thickness of 5 mm and an inside diameter of 30 mm.

In this test, the specimen contained glass. The type of glass is indicated in Table 1. This is conventional soda-lime (CSL) glass or extra-white soda-lime (EWSL) glass.

The crucible containing the glass was then brought to the desired temperature (1250° C. in the case of CSL and 1150-1250° C. in the case of EWSL glass) in air for 30 hours in order to reproduce the temperature and atmosphere conditions characteristic of industrial operating conditions.

The bubble index (BI) was then measured, this being between 1 (minimum bubbling) and 10 (intense bubbling), corresponding to the number of gas bubbles trapped in the glass after cooling. The bubble index is considered as good if it is equal to 5 or below.

The chemical composition of various products tested and the results of the tests are given in Table 1. The composition is an average chemical composition, given as a percentage by weight on the basis of the mineral oxides. The balance corresponds to CaO and to impurities such as MgO, $K_2O$ and $Fe_2O_3$.

TABLE 1

| Test | $Al_2O_3$ (%) | $ZrO_2$ (%) | $SiO_2$ (%) | Addition | Addition (%) | Glass | BI |
|---|---|---|---|---|---|---|---|
| 1 | 75.5 | 10.5 | 12.5 |  | 0 | EWSL | 9 |
| 2 | 75.0 | 10.5 | 12.5 | $Y_2O_3$ | 0.5 | EWSL | 9 |
| 3 | 74.5 | 10.5 | 12.5 | $Y_2O_3$ | 1 | EWSL | 5 |
| 4 | 74.0 | 10.5 | 12.5 | $Y_2O_3$ | 1.5 | EWSL | 4 |

TABLE 1-continued

| Test | $Al_2O_3$ (%) | $ZrO_2$ (%) | $SiO_2$ (%) | Addition | Addition (%) | Glass | BI |
|---|---|---|---|---|---|---|---|
| 5 | 73.5 | 10.5 | 12.5 | $Y_2O_3$ | 2 | EWSL | 2 |
| 6 | 72.5 | 10.5 | 12.5 | $Y_2O_3$ | 3 | EWSL | 2 |
| 7 | 71.5 | 10.5 | 12.5 | $Y_2O_3$ | 4 | EWSL | 2 |
| 8 | 70.5 | 10.5 | 12.5 | $Y_2O_3$ | 5 | EWSL | 2 |
| 9 | 70.0 | 19.0 | 10.0 | | 0 | EWSL | 9 |
| 10 | 68.0 | 19.0 | 10.0 | $Y_2O_3$ | 2 | EWSL | 5 |
| 11 | 67.0 | 19.0 | 10.0 | $Y_2O_3$ | 3 | EWSL | 5 |
| 12 | 53.0 | 28.5 | 16.0 | | 0 | EWSL | 6 |
| 13 | 51.0 | 28.5 | 16.0 | $Y_2O_3$ | 2 | EWSL | 5 |
| 14 | 93.0 | 0.0 | 6.0 | | 0 | EWSL | 8 |
| 15 | 91.5 | 0.0 | 6.0 | $Y_2O_3$ | 1.5 | EWSL | 5 |
| 16 | 91.0 | 0.0 | 6.0 | $Y_2O_3$ | 2 | EWSL | 5 |
| 17 | 91.0 | 0.0 | 6.0 | $Y_2O_3$ | 2 | EWSL | 5 |
| 18 | 90.0 | 0.0 | 6.0 | $Y_2O_3$ | 3 | EWSL | 5 |
| 19 | 89.0 | 0.0 | 6.0 | $Y_2O_3$ | 4 | EWSL | 5 |
| 20 | 93.0 | 0.0 | 6.0 | | 0 | CSL | 6 |
| 21 | 92.0 | 0.0 | 6.0 | $Y_2O_3$ | 1 | CSL | 5 |
| 22 | 91.0 | 0.0 | 6.0 | $Y_2O_3$ | 2 | CSL | 5 |
| 23 | 90.0 | 0.0 | 6.0 | $Y_2O_3$ | 3 | CSL | 4 |
| 24 | 89.0 | 0.0 | 6.0 | $Y_2O_3$ | 4 | CSL | 4 |
| 25 | 48.0 | 30.0 | 20.0 | | 0 | EWSL | 7 |
| 26 | 46.0 | 30.0 | 20.0 | $Y_2O_3$ | 2 | EWSL | 3 |
| 27 | 45.0 | 30.0 | 20.0 | $Y_2O_3$ | 3 | EWSL | 3 |
| 28 | 45.0 | 28.0 | 22.0 | $Y_2O_3$ | 3 | EWSL | 3 |
| 29 | 42.0 | 33.0 | 20.0 | $Y_2O_3$ | 3 | EWSL | 3 |
| 30 | 91.5 | 0.0 | 6.0 | $TiO_2$ | 1.5 | EWSL | 7 |
| 31 | 91.0 | 0.0 | 6.0 | $TiO_2$ | 2 | EWSL | 5 |
| 32 | 90.0 | 0.0 | 6.0 | $TiO_2$ | 3 | EWSL | 3 |
| 33 | 88.5 | 0.0 | 6.0 | $TiO_2$ | 4.5 | EWSL | 3 |
| 34 | 40.0 | 32.0 | 22.0 | $TiO_2$ | 4.0 | EWSL | 4 |
| 35 | 92.0 | 0.0 | 6.0 | $Sb_2O_3$ | 1.0 | EWSL | 5 |
| 36 | 90.0 | 0.0 | 6.0 | $Sb_2O_3$ | 3 | EWSL | 2 |
| 37 | 89.0 | 0.0 | 6.0 | $Sb_2O_3$ | 4.0 | EWSL | 2 |
| 38 | 91.5 | 0.0 | 6.0 | $V_2O_3$ | 1.5 | EWSL | 4 |
| 39 | 90.5 | 0.0 | 6.0 | $V_2O_3$ | 2.5 | EWSL | 4 |
| 40 | 91.0 | 0.0 | 6.0 | $Yb_2O_3$ | 1.0 | EWSL | 4 |
| 41 | 90.0 | 0.0 | 6.0 | $Yb_2O_3$ | 2.0 | EWSL | 3 |
| 42 | 92.0 | 0.0 | 6.0 | $Na_2O$ | 1.0 | EWSL | 5 |
| 43 | 90.5 | 0.0 | 6.0 | $Na_2O$ | 2.5 | EWSL | 5 |
| 44 | 93.0 | 0.0 | 4.0 | $Y_2O_3$ | 2.0 | CSL | 4 |
| 45 | 94.0 | 0.0 | 4.0 | $Y_2O_3$ | 1 | CSL | 5 |
| 46 | 90.0 | 0.0 | 5.0 | $TiO_2$ | 4.0 | EWSL | 3 |
| 47 | 71.5 | 10.5 | 12.5 | $Y_2O_3(2)$ + $TiO_2(2)$ | 4.0 | EWSL | 2 |
| 48 | 70.5 | 10.5 | 12.5 | $Y_2O_3(3)$ + $Sb_2O_3(2)$ | 5.0 | EWSL | 2 |
| 49 | 98.5 | 0.0 | 5.0 | $Y_2O_3(2.5)$ + $Yb_2O_3(2)$ | 4.5 | EWSL | 3 |
| 50 | 40 | 40 | 15 | $Y_2O_3$ | 3 | EWSL | 3 |
| 51 | 42 | 37 | 16 | $Y_2O_3$ | 3 | EWSL | 4 |
| 52 | 95 | 0 | 3 | $Y_2O_3$ | 2 | CSL | 5 |
| 53 | 96.7 | 0 | 2.3 | $Y_2O_3$ | 0 | EWSL | 6 |
| 54 | 95.7 | 0 | 2.3 | $Y_2O_3$ | 1 | EWSL | 3 |
| 55 | 94.7 | 0 | 2.3 | $Y_2O_3$ | 2 | EWSL | 2 |
| 56 | 96.7 | 0 | 2.7 | $Y_2O_3$ | 0 | EWSL | 6 |
| 57 | 95.7 | 0 | 2.7 | $Y_2O_3$ | 1 | EWSL | 4 |
| 58 | 94.7 | 0 | 2.7 | $Y_2O_3$ | 2 | EWSL | 2 |

These examples show that a total addition of one or more of the oxides $Y_2O_3$, $V_2O_5$, $TiO_2$, $Sb_2O_3$, $Yb_2O_3$ and $Na_2O$ of above 1% preferably above 1.5% reduces bubbling and thus considerably reduces the formation of defects in the glass.

It is difficult to introduce $Sb_2O_3$ because it partially volatilizes during sintering. $Yb_2O_3$ is a very expensive compound compared with the other oxides of the composition. Moreover, $TiO_2$ has, in certain cases, a risk of coloring the glass and could act on the sintering. For these reasons, $Y_2O_3$ is the preferred addition for reducing bubbling. The examples show that it has an optimum effect for a content of between 1.5 and 2.5%.

Comparing Examples 14 and 30 shows that the addition of 1.5% $TiO_2$ has a positive effect on the bubble index. However, comparison of Examples 30 and 31 shows that a $TiO_2$ content of greater than 2% is preferable when $TiO_2$ constitutes the only oxide from $Y_2O_3$, $V_2O_5$, $TiO_2$, $Sb_2O_3$, $Yb_2O_3$ and $Na_2O$ that had to be added.

Crystallographic analysis of the products of the invention shows that the main phase is corundum, possibly combined with mullite and zirconia.

Moreover, when zirconia is present it is in monoclinic or tetragonal form. The $Y_2O_3+V_2O_5+TiO_2+Sb_2O_3+Yb_2O_3+Na_2O$ contents of the invention are therefore insufficient to completely stabilize the zirconia. Moreover, it is found that these oxides make it possible to reduce bubbling on aluminous products containing no zirconia. The invention therefore does not pertain to zirconia stabilization.

Without being tied down by any theory, the Applicant explains the performance of the products according to the invention in the following manner.

Mullite in the fine fraction could result in a modification of the conduction properties of the product, in particular of its fines (particles smaller than 50 μm), by the creation of new phases or by limitation of existing phases in the control product (for example mullite). The presence in the green part of one or more of the oxides from $Y_2O_3$, $V_2O_5$, $TiO_2$, $Sb_2O_3$, $Yb_2O_3$ and $Na_2O$ would advantageously limit the availability of alumina and/or silica which are liable to react to form mullite in the fine fraction.

Of course, the present invention is not limited to the embodiment described and shown, being provided by way of nonlimiting illustrative example.

The invention claimed is:

1. A region of a glassmaking furnace comprising a sintered refractory product obtained by sintering a green part having the following average mineral chemical composition, in percentages by weight on the basis of the mineral oxides:

$40\% \leq Al_2O_3$, $0\% \leq ZrO_2 \leq 41\%$, $2\% \leq SiO_2 \leq 22\%$, $1\% < Y_2O_3 + V_2O_5 + TiO_2 + Sb_2O_3 + Yb_2O_3$.

2. The region according to claim 1, wherein said green part has the following average mineral chemical composition, in percentages by weight on the basis of the mineral oxides:

$40\% \leq Al_2O_3 \leq 94\%$, $0\% \leq ZrO_2 \leq 41\%$, $2\% \leq SiO_2 \leq 22\%$, $1\% < Y_2O_3 + V_2O_5 + TiO_2 + Sb_2O_3 + Yb_2O_3$.

3. The region according to claim 1, wherein the composition of said green part is such that, in percentages by weight on the basis of the mineral oxides:

$3\% \leq SiO_2 \leq 22\%$.

4. The region according to claim 1, wherein the composition of said green part is such that, in percentages by weight on the basis of the mineral oxides:

$TiO_2 \geq 2\%$.

5. The region according to claim 1, wherein the composition of said green part is such that, in percentages by weight on the basis of the mineral oxides:

$Y_2O_3 + V_2O_5 + TiO_2 + Sb_2O_3 + Yb_2O_3 \leq 5\%$.

6. The region according to claim 1, wherein the composition of said green part is such that, in percentages by weight on the basis of the mineral oxides:

$Y_2O_3 + V_2O_5 + TiO_2 + Sb_2O_3 + Yb_2O_3 > 2\%$.

7. The region according to claim 1, wherein the green part is such that, in percentages by weight on the basis of the mineral oxides:

$Y_2O_3 + V_2O_5 + TiO_2 + Sb_2O_3 + Yb_2O_3 > 3\%$.

8. The region according to claim 1, wherein the green part is such that, in percentages by weight on the basis of the mineral oxides, of at least one oxide from $Y_2O_3$, $V_2O_5$, $TiO_2$, $Sb_2O_3$, and $Yb_2O_3$ is greater than 1%.

9. The region according to claim 1, wherein the green part is such that, the content, in percentages by weight on the basis of the mineral oxides, of at least one oxide from $Y_2O_3$, $V_2O_5$, $TiO_2$, $Sb_2O_3$, and $Yb_2O_3$ is greater than 2%.

10. The region according to claim 1, wherein the green part is such that, the content, in percentages by weight on the basis of the mineral oxides, of at least one oxide from $Y_2O_3$, $V_2O_5$, $TiO_2$, $Sb_2O_3$, and $Yb_2O_3$ is greater than 3%.

11. The region according to claim 1, wherein the green part is such that in percentages by weight on the basis of the mineral oxides:

$Y_2O_3 \geq 1\%$.

12. The region according to claim 1, wherein the green part is such that, in percentages by weight on the basis of the mineral oxides:

$Y_2O_3 \geq 2\%$.

13. The region according to claim 1, wherein the green part is such that, in percentages by weight on the basis of the mineral oxides:

$Y_2O_3 \geq 3\%$.

14. A process comprising at least the following successive steps:
   a) preparation of a green part having the following average mineral chemical composition, in percentages by weight on the basis of the mineral oxides:

$40\% \leq Al_2O_3$, $0\% \leq ZrO_2 \leq 41\%$, $2\% \leq SiO_2 \leq 22\%$, $1\% < Y_2O_3 + V_2O_5 + TiO_2 + Sb_2O_3 + Yb_2O_3$, said green part being obtained from a mixture of raw materials to which no $Fe_2O_3$ has been added, but as an impurity in the raw materials, and to which has been added an amount of greater than 1% and of 5% or less of a constituent consisting of one or more oxides selected from the group consisting of $Y_2O_3$, $V_2O_5$, $TiO_2$, $Sb_2O_3$, and $Yb_2O_3$, in percentages by weight on the basis of the mineral oxides;
   b) sintering said green part to obtain a sintered refractory product; and
   c) employment of said sintered refractory product in a region of a glassmaking furnace for the manufacture of soda lime or extra white soda lime glass.

15. The process according to claim 14, in which, at step b), the green part is sintered at a temperature of between 1300° C. and 1500° C.

16. The process according to claim 14, in which at step b) the green part is sintered to form a refractory block.

17. The region according to claim 1, wherein said green part is in a form of a block.

18. The region according to claim 1, wherein in said green part $Y_2O_3 + V_2O_5 + Sb_2O_3 + Yb_2O_3 > 1\%$.

19. The region according to claim 1, wherein said green part is obtained by adding to a mixture of raw materials an amount greater than 1% of a constituent consisting of one or more oxides selected from the group consisting of $Y_2O_3$, $V_2O_5$, $TiO_2$, $Sb_2O_3$ and $Yb_2O_3$.

* * * * *